(12) United States Patent
Hatano et al.

(10) Patent No.: US 7,828,134 B2
(45) Date of Patent: Nov. 9, 2010

(54) ARTICLE ALIGNMENT APPARATUS

(75) Inventors: Kouichi Hatano, Kawasaki (JP); Junichi Ishikawa, Niihama (JP); Masaaki Suzuki, Tochigi (JP); Hidenori Shirai, Kanagawa (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 12/084,401

(22) PCT Filed: Nov. 1, 2006

(86) PCT No.: PCT/JP2006/322315

§ 371 (c)(1),
(2), (4) Date: Jul. 31, 2008

(87) PCT Pub. No.: WO2007/052823

PCT Pub. Date: May 10, 2007

(65) Prior Publication Data

US 2009/0139837 A1 Jun. 4, 2009

(30) Foreign Application Priority Data

| Nov. 2, 2005 | (JP) | ............................... 2005-320013 |
| Mar. 28, 2006 | (JP) | ............................... 2006-089195 |

(51) Int. Cl.
*B65G 47/24* (2006.01)

(52) U.S. Cl. ............................. 198/397.04; 198/397.05

(58) Field of Classification Search ............ 198/397.03, 198/397.04, 397.05, 450
See application file for complete search history.

(56) References Cited

U.S. PATENT DOCUMENTS

| 1,750,310 | A | * | 3/1930 | Jonkel et al. | ................. 198/396 |
| 3,463,293 | A | * | 8/1969 | Lederer | ...................... 198/399 |
| 3,503,486 | A | * | 3/1970 | Alexander et al. | ....... 198/462.1 |
| 3,827,582 | A | * | 8/1974 | Lederer | ................... 198/419.1 |
| 4,391,560 | A | * | 7/1983 | Fardin | ......................... 198/406 |
| 4,789,290 | A | * | 12/1988 | Barnhart et al. | ........ 198/397.04 |

FOREIGN PATENT DOCUMENTS

| DE | 198 30 558 A1 | 1/2000 |
| JP | 51-47753 A | 4/1976 |
| JP | 54-088569 A | 7/1979 |
| JP | 2004-168542 A | 6/2004 |

* cited by examiner

*Primary Examiner*—James R Bidwell
(74) *Attorney, Agent, or Firm*—Birch, Stewart, Kolasch & Birch, LLP

(57) ABSTRACT

There is provided an article alignment apparatus 10 including an article alignment device for aligning orientations of articles by arranging two aligners 21, 21 having cylindrical surfaces, rotating each of the aligners 21 while keeping it at a predetermined inclination with respect to a horizontal direction, placing the articles on cylindrical outer surfaces of the two aligners 21, and carrying the articles from one side to the other side, in which protrusions 22 are provided on the surfaces of the aligners 21.

13 Claims, 10 Drawing Sheets

ARTICLE ALIGNMENT APPARATUS

FIELD OF THE INVENTION

The present invention relates to an article alignment apparatus.

BACKGROUND OF THE INVENTION

Conventionally, in filling and capping equipment for filling liquid into a container and capping the container, a cap alignment apparatus (article alignment apparatus) for aligning and feeding caps in various forms is used.

There is an article alignment apparatus as disclosed in Japanese Patent Publication (JP-A) No. 51-47753 (Patent Document 1) in which a cylindrical gutter-shaped member is inclined and rotated and box-shaped articles are put into the gutter-shaped member and are carried from one side to the other side to thereby bring the articles into balanced attitudes and, as a result, align orientations of the articles.

There is an article alignment apparatus as disclosed in Japanese Patent Publication (JP-A) No. 2004-168542 (Patent Document 2) in which, in arranging two columns parallel while inclining them and rotating the columns in reverse directions to each other in such directions as to cause articles to float up due to friction to thereby feed and carry long-columnar articles with heads such as screws and rivets on the two columns, spiral grooves for supporting the articles are formed on surfaces of the two columns to align the long-columnar articles with heads in hanged manners and while leaving spaces between them.

In the article alignment apparatus in Patent Document 1, the center of gravity of a box-shaped article moves as the gutter-shaped member rotates and the center of gravity of the box-shaped article is positioned outside a rotation center of the box-shaped article on the gutter-shaped member to thereby bring down the box-shaped article on a cylindrical face of the gutter-shaped member to bring the box-shaped article into a balanced attitude (attitude with an open face of the box-shaped article up) to align orientations of the box-shaped articles.

However, in the article alignment apparatus in Patent Document 1, the box-shaped article slips against the cylindrical face of the rotating gutter-shaped member and it is difficult to reliably move the center of gravity of the box-shaped article in the above-described manner as the gutter-shaped member rotates and it is difficult to stably and reliably align orientations of the box-shaped articles.

In the article alignment apparatus in Patent Document 2, the long-columnar articles with heads move as the columns rotate and a head portion of the long-columnar article with the head is hanged in the spiral grooves in the surfaces of the columns to thereby carry out alignment of the articles while leaving spaces between them.

However, if the article alignment apparatus in Patent Document 2 tries to align cylindrical articles with top faces such as caps which are not the long-columnar articles with heads, it is difficult to align the articles in a certain orientation, though it is possible to space the articles from each other. The article that has once entered the spiral groove is carried to an outlet while kept in the orientation.

SUMMARY OF THE INVENTION

According to the invention, there is provided an article alignment apparatus comprising at least one aligner having rotary cylindrical surfaces with protrusions, wherein the aligner slants at a predetermined inclination with respect to a horizontal direction so that the aligner is capable of aligning an article on its surface by placing the articles on the cylindrical outer surfaces of the aligner, so that the articles are movable from one end to the other end of the aligner.

DETAILED DESCRIPTION OF THE INVENTION

The present invention stably and reliably aligns orientations of articles with a simple configuration.

Articles to be aligned by the article alignment apparatus are not limited to caps but the apparatus can be applied to articles having deviated centers of gravity, articles in shapes other than shapes such as spheres that roll easily, and the like.

The following describe and demonstrate embodiments of the present invention and are given solely for the purpose of illustration and are not to be construed as limitations of the present invention.

Figure 1A:
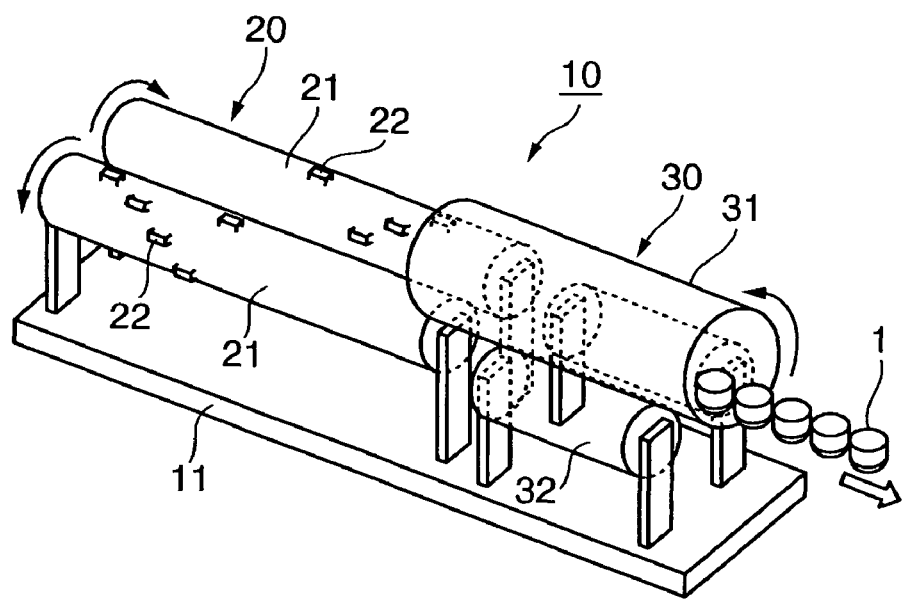
FIGS. 1A and 1B are schematic drawings showing an article alignment apparatus.
Figure 1B:
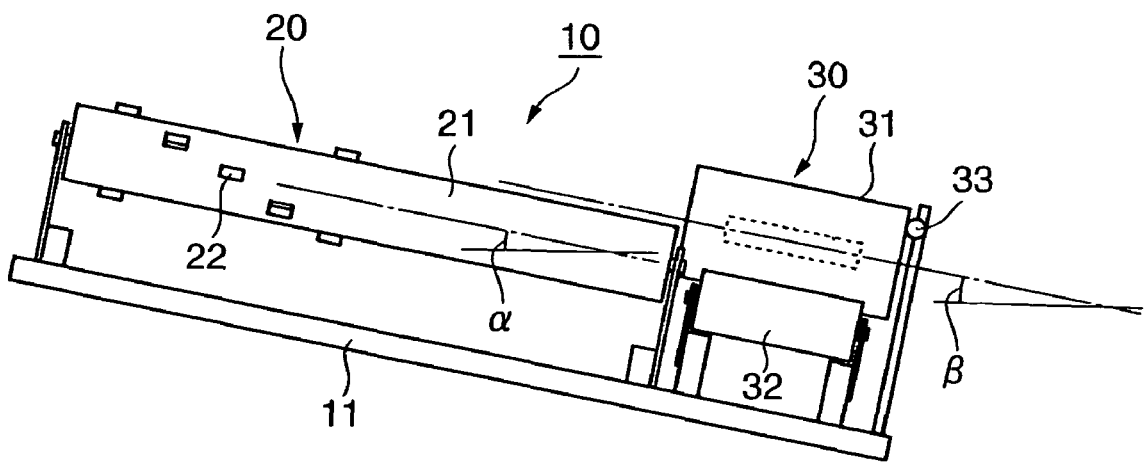

An article alignment apparatus 10 in FIGS. 1A and 1B aligns orientations of caps 1 (articles). The cap 1 is in a cylindrical shape with a top face and an alignment target attitude of the cap 1 is an attitude with a top face down and an open face up (the center of gravity of the cap 1 is near the top face).

The cap 1 to be aligned may be in any shape when seen from above. Examples of the shape are a circle, a track shape, an oval shape, a rectangle, a polygon, and shapes obtained by partially deforming them. It is possible to adapt to a cap having a tube with its alignment target attitude being an attitude with an open face up, if the tube is light with respect to the cap weight. The cap 1 is preferably in a shape with round outer peripheral edges on a top face side of the cap 1 when seen from a side and the cap 1 has such a rounded shape in general. A radius of the cap 1 is preferably 0.2 mm or greater and is more preferably 0.5 mm or greater. The cap 1 may have such a shape that its outer peripheral edges on the top face side are diagonally cut off. The cut-off length is preferably 0.1 mm or greater and is more preferably 0.4 mm or greater. By forming the top face side of the cap 1 in such a shape, it is possible to reduce the influence of protrusions 22 of aligners 21 which will be described later when the cap 1 comes into an attitude with its top face down. The article alignment apparatus 10 can adapt to an article with its outer peripheral edges not rounded or not cut off, though a success rate of alignment is reduced only slightly.

Any material can be selected as the material of the cap 1. For example, the cap 1 may be made of resin material such as polypropylene or metal material such as aluminum and iron.

The article alignment apparatus 10 is formed by disposing a first article alignment device 20 and a second article alignment device 30 on a stand 11 as shown in FIGS. 1A and 1B. A cap feed chute (not shown) is connected to an upstream side of the first article alignment device 20. A downstream end of the first article alignment device 20 and an upstream end of the second article alignment device 30 are connected to each other, and a cap discharge conveyer (not shown) is connected to a downstream side of the second article alignment device 30.

The caps 1 fed from the feed chute are aligned at the first article alignment device 20, further aligned in a finishing manner at the second article alignment device 30, and then discharged through the discharge conveyer.

(Configuration of the First Article Alignment Device 20)

In the first article alignment device 20, as shown in FIGS. 1A and 1B, in arranging two aligners 21, 21 having cylindrical outer surfaces parallel to each other, rotating the aligners 21, 21 while keeping them at predetermined inclinations a with respect to a horizontal direction, and placing the caps 1 on the outer surfaces of the aligners 21, 21 to align orientations of the caps 1 while carrying the caps 1 from one side to the other aide by the action of gravity, protrusions 22 are provided on the outer surfaces of the aligners 21, 21. The above-described inclination α of the aligners 21 is preferably 30 to 200 and is more preferably 5° to 15°. If the inclination α is large, the caps 1 may roll without being aligned. If the inclination α is small, a moving speed by the action of gravity of the cap 1 reduces to reduce throughput.

A size of the first article alignment device 20 is regulated properly based on a shape of the cap 1. For example, in case of the cap 1 having a diameter or a width of about 20 mm to 80 mm, for example, a diameter of a cylinder is preferably about 20 to 150 mm. A length of the cylinder is preferably about 200 to 3000 mm and more preferably about 400 to 2000 mm in view of aligning performance and installation space.

The throughput of the caps 1 is different depending on a size and material of the cap 1, sizes of the cylinders, states of outer surfaces, the inclination angle α, and sizes and the number of the protrusions 22 of the aligners 21 but is preferably 30/min to 250/min and further preferably 50/min to 150/min. If a feed speed of the caps 1 is excessively high, the caps 1 tumble down out of the aligners 21 and recovery of the caps 1 becomes necessary. Moreover, the caps 1 may approach each other and interfere much with each other on the aligners 21 to reduce the success rate of alignment in some cases. If the feed speed of the caps 1 is excessively small instead, production efficiency reduces. The optimal throughput varies depending on the various conditions as described above and therefore is not limited to the throughput described here.

Peripheral speeds of the outer surfaces of the first article alignment device 20 are properly determined based on the weight or size of cap 1 as an object to be aligned. For example, in case of the cap 1 having a weight smaller than 40 g and of a diameter or a width of about 20 mm to 80 mm, the peripheral speed of each outer surface is preferably regulated to be about 0.05 to 1.5 m/sec and more preferably 0.15 to 0.7 m/sec. If the peripheral speed is low, an effect of rotation cannot be seen. If the peripheral speed is excessively high, the caps 1 may leap out of the aligners 20 or the caps 1 that have been aligned once may be brought into random arrangements again in some cases.

The outer surfaces of the aligners 21 of the first article alignment device 20 may be normal surfaces such as metal surfaces given uni-chrome plating, stainless steel surfaces, resin surfaces, and the like. Moreover, by changing properties and characteristics of the outer surfaces of the aligners 21, a carry speed can be regulated depending on a kind and the like of the cap 1. It is possible to form rubber-like outer surfaces of the aligners 21 to increase friction to reduce the carry speed or it is possible to reduce friction to increase the carry speed by subjecting the outer surfaces of the aligners 21 to a silicon treatment or a fluorine treatment, sticking adhesive tape made of fluorocarbon resin on the outer surfaces, or selecting resin material having good slipperiness.

Especially by subjecting the cylindrical outer surfaces of the aligners 21 to a friction reducing treatment, it is possible to enhance the throughput and alignment success rate. The throughput is enhanced because the carry speed of the caps 1 is increased by the friction reducing treatment, even if the inclination α is small. The alignment success rate is enhanced because it is possible to prevent a phenomenon in which the caps 1 roll without being aligned by reduction of the inclination α.

In the first article alignment device 20, a method of rotating the two aligners 21, 21 by motors mounted in the respective aligners 21 can be employed as a method of driving the aligners 21, 21. It is also possible to dispose a motor outside the aligners 21 to rotate the aligners 21 through drive transmission by a belt, a gear, or the like.

The first article alignment device 20 has a function of regulating the inclinations of the two aligners 21, 21, with respect to the horizontal direction according to the kind or the like of the cap 1.

Figure 2A:
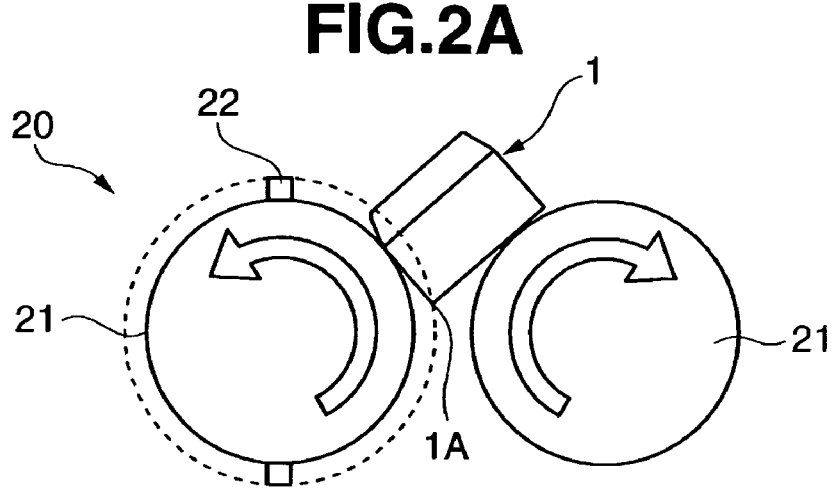
FIGS. 2A to 2C are schematic drawings showing an alignment operation by a first article alignment device.
Figure 2B:
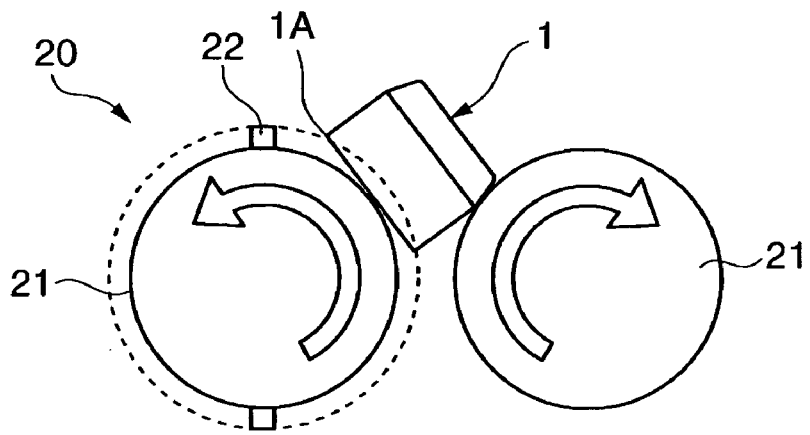
Figure 2C:
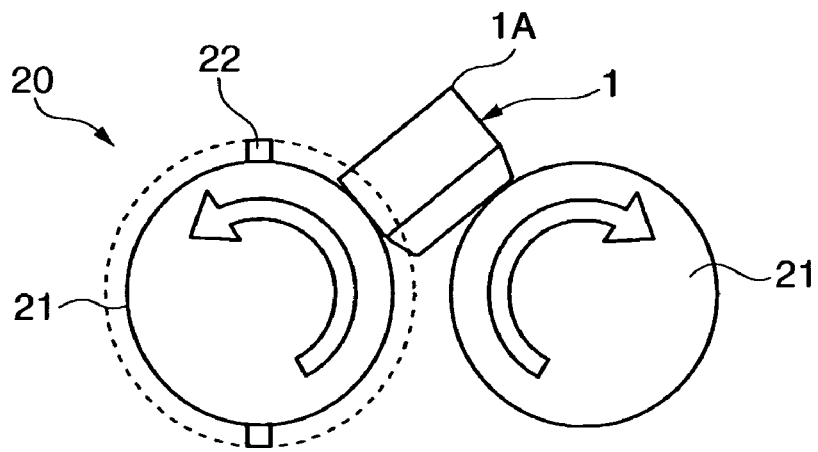
Figure 3:
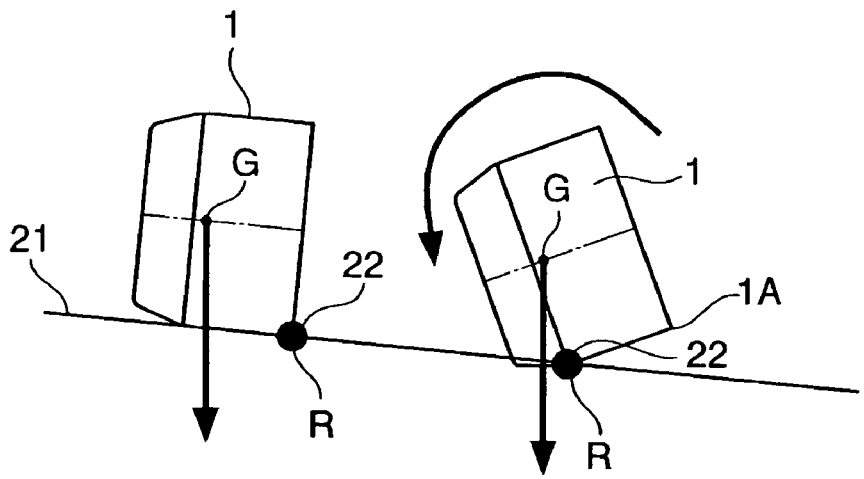
FIG. 3 is a schematic drawing showing a principle of bringing down of a cap.

In the first article alignment device 20, while the cap 1 is carried along the cylindrical outer surfaces of the two aligners 21, 21 by the action of gravity, as shown in FIGS. 2A to 2C, an edge 1A of the open face of the cap 1 is brought into contact with the protrusion 22 on the aligner 21 to change the orientation of the cap 1 (FIG. 2B) and the next protrusion 22 lifts the cap 1 and inverts the cap 1 upside down (FIG. 2C) to align the cap 1 with the open face down into the balanced attitude (attitude with the open face up and top face down). Even if the cap 1 is in such an orientation as shown in FIG. 3, the cap 1 is given a rotating force by the protrusion 22 that has come into contact with the edge 1A of the open face of the cap 1 and is brought down on the aligners 21 when the center G of gravity of the cap 1 is positioned outside a rotation center R of the cap 1 on the aligners 21.

In the first article alignment device 20, a height of each protrusion 22 provided to the aligners 21 is properly regulated depending on the diameters and a clearance between the two aligners 21 or the shape of the cap 1. For example, if the diameter of the cylinder of the aligner is 60 mm, the height of the protrusion 22 is preferably 2 mm to 20 mm and more preferably 3 mm to 10 mm. A shape of each protrusion 22 is not especially limited but is preferably a rectangle, an elongated circle, an oval, or the like which is long in an axial direction of the aligner 21 when seen from above. A longitudinal length is preferably 20 to 150% and more preferably 50 to 100% of the maximum length of the cap 1 when seen from above. If the longitudinal length of each protrusion 22 is small, a chance of collision of the protrusion 22 with the cap 1 reduces to reduce alignment efficiency and therefore a large number of protrusions 22 are required. If the longitudinal length of each protrusion 22 is great, lengths of the two aligners 21, 21 increase to increase the first article alignment device 20 in size when a large number of protrusions 22 are disposed.

The protrusion 22 is made of metal, resin, or the like and the material of the protrusion 22 is not especially limited. However, it is preferable that the edge portions of the protrusion 22 are chamfered or rounded so as to prevent damage to the cap 1.

In case of chamfering, the chamfer is preferably of C0.2 to C2.5 and is more preferably of C0.5 to C1.5. If the value of the chamfering is small little damage prevention effect is produced. If the value is great, an effect of the protrusion is reduced to make alignment difficult. An angle of the chamfering does not necessarily have to be 45 degrees.

In case of rounding, rounding is preferably of R0.2 to R2.5 and more preferably R0.5 to R1.5. If the value of rounding is small, little damage prevention effect is produced. If the value is great, an effect of the protrusion is reduced to make alignment difficult.

If the protrusion 22 is made of flexible material, it is possible to substantially completely prevent damage to the cap in alignment of the cap 1. Examples of the flexible material are synthetic rubber, natural rubber, urethane, and the like. Moreover, because these materials have higher surface friction than metal or resin materials, they are especially effective for a slippery cap material or a cap 1 that is heavy in weight.

If the protrusion 22 is a suction member, it is possible to more reliably lift up and align the cap 1. In case of material that completely sucks the cap 1, the cap may be carried to and dropped from lower portions of the cylinders or may clog the rolling-in portion of the two cylinders. Therefore, as the suction member, slightly adhesive material from which the cap 1 is detached under its own weight is preferable. Examples of the slightly adhesive material are rubber resin or rubber mixture. For example, ether polyurethane resin, polyamide resin, styrene-ethylene resin, butylene-styrene resin, styrene-ethylene/butylene-styrene block copolymer, a mixture of the above copolymer and naphthene, or the like can be employed and an adhesive of a solution type having normal-temperature adhesion property, an emulsion type, or a hot-melt type and an acrylic, rubber, urethane, or silicone adhesive can be employed. To put it concretely, for example, Steep Slope Belt (trade name, having a surface material made of adhesive low hardness urethane) of BANDO CHEMICAL INDUSTRIES, LTD. or gel sheet such as "Pro-7" (trade name, made of urethane elastomer) of Pro-7 Co., Ltd., and "Hitohada (human skin) gel sheet" and "Hyper-gel sheet" (trade names, made of urethane) of EXSEAL CORPORATION can be used.

Figure 12:
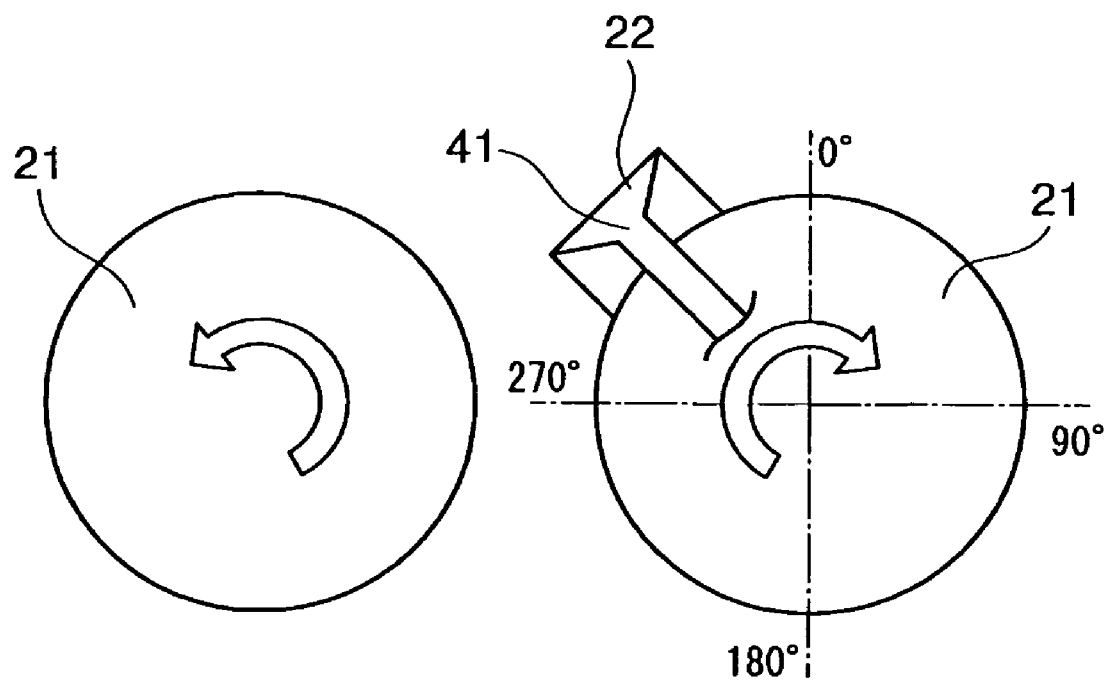
FIG. 12 is a schematic drawing showing a variation of a protrusion in the first article alignment device.

If a suction mechanism 41 such as vacuum suction as shown in FIG. 12 is provided to the protrusion 22 and vacuum suction is stopped when the protrusion 22 is oriented upward to release the cap 1, reliability of alignment can be enhanced as compared with the simple protrusion, though the mechanism becomes complicated. The case of an angle shown in FIG. 12 will be described. Although optimal timing is different depending on performance of a vacuum generator, it is preferable that vacuum suction is started from around 250° and that vacuum suction is stopped around 20°. If a commercially available vacuum suction pad is used as the suction member including the suction mechanism 41, similar effects can be obtained.

In the first article alignment device 20, a size of the clearance between the two aligners 21, 21 excluding the heights of the protrusions 22 is 0 to 99% and preferably 5 to 70% of a minimum length of a size of the cap 1. If the size of the clearance is 100% of the minimum length of the size of the cap 1, the cap 1 drops between the two aligners 21, 21. If the size of the clearance is relatively large, it is necessary to increase the heights of the protrusions 22 for inverting the cap 1. If the size of the clearance is relatively small, the cap 1 cannot be held stably between the two aligners 21, 21 and a phenomenon in which the cap 1 is flicked away from the aligners 21 occurs frequently.

In the first article alignment device 20, the protrusions 22 provided to each aligner 21 are arranged spirally and the downstream protrusion 22 is arranged ahead of the upstream protrusion 22 in a direction of rotation. The downstream protrusion 22 is arranged preferably 10° to 90° and more preferably 30 to 55° ahead of the upstream protrusion 22 in the direction of rotation. If an arrangement angle is small, the protrusions 22 are substantially contiguous to each other and the upstream and downstream protrusions 22 completely scoop up the cap 1, and a phenomenon in which the cap 1 is flicked out of the aligners 21 occurs frequently. If the arrangement angle is proper, a traveling speed of the cap 1 is slightly suppressed by the downstream protrusion 12, the cap 1 is inverted so that the open face of the cap 1 that has been facing down faces up by the upstream protrusion 22, and alignment of the caps 1 is carried out most efficiently and properly. If the arrangement angle is large, it is impossible to carry out the cap alignment with the upstream and downstream two protrusions 22 and it is necessary to invert the cap 1 with one protrusion 22. Therefore, the cap alignment success rate reduces slightly and the provision of a large number of protrusions 22 may become necessary. If high alignment efficiency or high performance is not required, it is possible to carry out alignment without problems, though disposition of the protrusions 22 is optional.

In the first article alignment device 20, a minimum distance between the upstream and downstream protrusions 22 provided to each aligner 21 is substantially equal to a minimum distance of the cap 1 when seen from above. The minimum distance between the upstream and downstream protrusions 22 is preferably 0.4 to 1.5 times and more preferably 0.6 to 1.4 times the minimum distance of the cap 1 when seen from above. If the minimum distance between the upstream and downstream protrusions 22 is 0 or short, the upstream and downstream protrusions 12 completely scoop up the cap 1 and a phenomenon in which the cap 1 is flicked out of the aligners 21 occurs frequently. If the minimum distance between the upstream and downstream protrusions 22 is substantially equal to the minimum distance of the cap 1 when seen from above, the traveling speed of the cap 1 is slightly suppressed by the downstream protrusion 22 and the cap 1 is inverted so that the open face of the cap 1 that has been facing down faces up by the upstream protrusion 22, and proper alignment of the caps 1 is carried out. If the minimum distance between the upstream and downstream protrusions 22 is long, it is impossible to carry out the cap alignment with the upstream and downstream two protrusions 22 and it is necessary to invert the cap 1 with one protrusion 22. Therefore, the cap alignment success rate reduces slightly and the provision of a large number of protrusions 22 may become necessary. If high alignment efficiency or high performance is not required, it is possible to carry out alignment without problems, though disposition of the protrusions 22 is optional.

In the first article alignment device 20, the protrusions 22 are disposed first on one of the two aligners 21, 21 on the upstream side and the protrusions 22 start to be disposed downstream from the end of the disposition of the protrusions on the other aligner 21. When the caps 1 are aligned by the protrusions 22, if both of the opposed aligners 21, 21 have the protrusions 22, the operation for inverting the cap 1 by the protrusions 22 becomes unstable. In order to further enhance the alignment efficiency, disposition of the protrusions on the other aligner 21 downstream from the end of disposition of the protrusions may be repeated.

In the first article alignment device 20, optimal directions of rotation of the two aligners 21, 21 are determined in various ways depending on relationships with frictional forces of the outer surfaces of the respective aligners 21 determined according to the caps 1. In the present embodiment, the two aligners 21, 21 rotate in reverse directions to each other as shown in FIGS. 2A to 2C, which is the more desirable. When one of the two aligners 21, 21 rotates in such a direction as to enter the upward valley between the two aligners 21, 21, a proper degree of force for rolling the cap 1 into the valley is applied to the cap 1 to thereby enhance the alignment efficiency. At this time, it is preferable in terms of prevention of damage to the cap 1 that the heights of the protrusions on the surface of the aligner 21 rotating in such a direction as to enter the upward valley are reduced or that no protrusion is provided to this aligner 21.

(Configuration of the Second Article Alignment Device 30)

As shown in FIGS. 1A and 1B, the second article alignment device 30 aligns the orientations of the caps 1 in the finishing manner in a process of rotating an aligner 31 having a cylindrical inner surface in an arbitrary single direction while keeping the aligner 31 at a predetermined inclination β with respect to the horizontal direction, putting the caps 1 coming out of the downstream end of the first article alignment device 20 onto the inner surface of the aligner 31, and carrying the caps 1 to a discharge port side by the action of gravity. Normally, it is preferable that the inclination β is substantially equal to the inclination α of the first article alignment device 20 in terms of a configuration of the apparatus. Here, if the inclination β is greater than the inclination α, the carry speed of the caps 1 in the second article alignment device 30 increases to increase a pitch of the caps 1. If the inclination β is smaller than the inclination α instead, the carry speed of the caps 1 reduces to reduce the pitch of the caps 1.

A diameter and a length of the aligner 31 are determined properly based on a size of the cap 1 as an object to be aligned. For example, in treating the cap 1 of a diameter or a width of about 20 to 80 mm, for example, the aligner is preferably of a size of the diameter of 50 to 250 mm and the length L of 200 to 1000 mm and more preferably 250 to 600 mm in view of installation space.

An inner peripheral speed of the aligner 31 is properly determined based on the weight of the cap 1 as the object to be aligned. For example, in case of the cap 1 having a weight less than 40 g, the peripheral speed is preferably regulated to be about 0.05 to 1.0 m/sec and more preferably 0.15 to 0.7 m/sec. If the peripheral speed is low, an effect of rotation cannot be seen. If the peripheral speed is too high, the caps 1 that have been aligned once may be brought into random arrangements again in some cases.

In the second article alignment device 30, properties and characteristics of the inner surface of the aligner 31 can be regulated depending on a kind or the like of the cap 1. It is possible to form a rubber-like inner surface of the aligner 31 to increase friction or to subject the inner surface of the aligner 31 to a silicon treatment to reduce friction.

In the second article alignment device 30, the aligner 31 is placed and rotated on a valley between two driving rollers 32, 32 arranged parallel to each other while being inclined downward toward the downstream side in the direction of travel.

In the second article alignment device 30, a roller in which a motor is mounted, i.e., the driving roller rotated by the motor mounted in the driving roller 32 can be employed as the driving roller 32. By placing the aligner 31 in a replaceable manner on the driving rollers 32 to drive the aligner 31 through friction with the driving rollers 32, various aligners 31 prepared in advance according to the kinds or the like of the caps 1 can be replaced with each other and used. In order to prevent the aligner 31 from sliding down along the inclination of the driving rollers 32, a stopper 33 is brought into contact with a lower end face of the aligner 31 (it is also possible to bring the lower end face of the aligner 31 into contact with flanges at lower ends of the driving rollers 32).

The second article alignment device 30 has a function of regulating the inclination of the aligner 31 with respect to the horizontal direction according to the kind or the like of the cap 1 by changing settings on the driving rollers 32. By changing the settings on the driving rollers 32, a height position of the aligner 31 with respect to the aligners 21, 21 of the first article alignment device 20 can be regulated according to the kind or the like of the cap 1.

Figure 4:
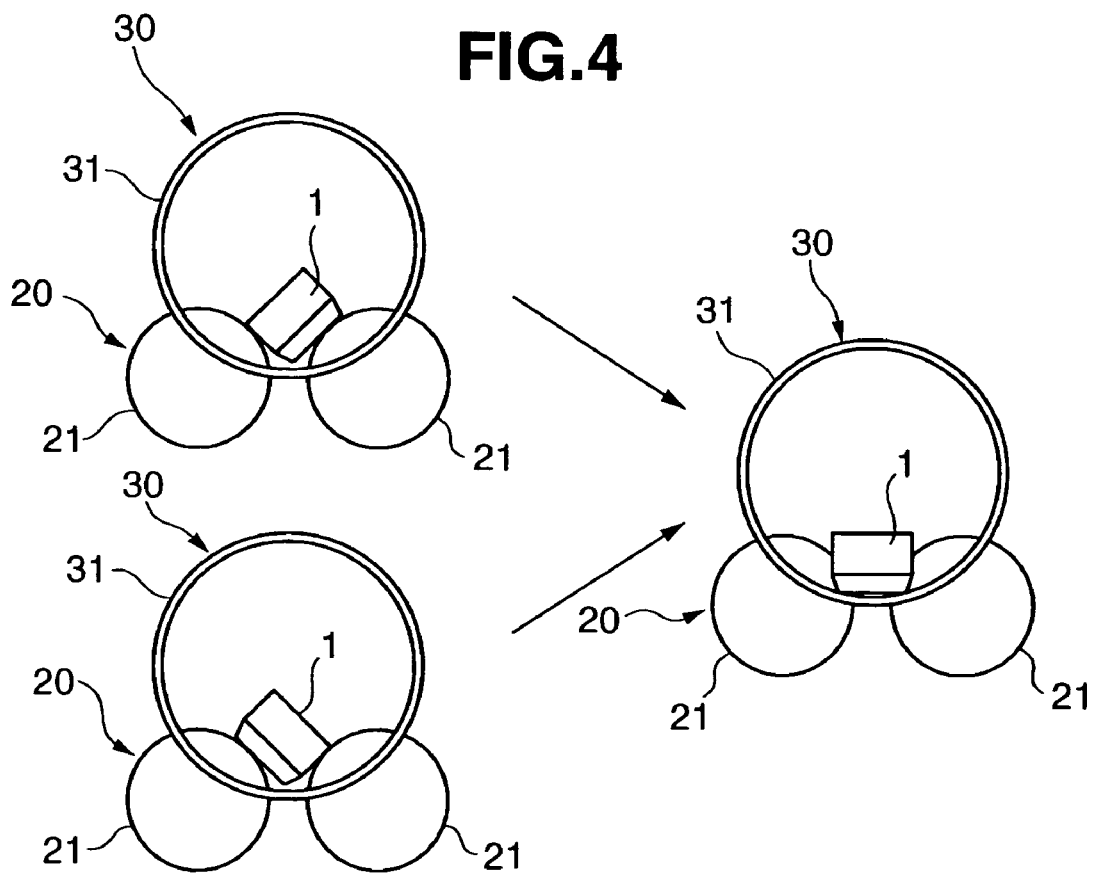
FIG. 4 is a schematic drawing showing an alignment operation by a second article alignment device.

In the second article alignment device 30, a diameter of the aligner 31 is disposed on a plumb line passing through the center of the valley formed by the cylindrical outer surfaces of the two aligners 21, 21 of the first article alignment device 20 in a front view from the downstream side in FIG. 4 to align the caps 1 fed from the first article alignment device 20 in a finishing manner so that a center line of the cap 1 is aligned with the plumb line and discharge the caps. In other words, at the outlet of the two aligners 21, 21, the cap 1 is inclined diagonally when seen from the outlet side and the top face of the cap 1 is in contact with either one of the two aligners 21, 21 so that there are two alignment orientations and therefore transfer to the next step is unstable. By disposing the aligner 31 of the second article alignment device 30 downstream from the two aligners 21, 21, the center line of the cap 1 is aligned with the plumb line to bring the caps 1 into one alignment orientation to stabilize transfer to the next step.

In the second article alignment device 30, by providing protrusions on a cylindrical inner peripheral face of the aligner 31, putting the caps 1 onto the cylindrical inner surfaces of the aligner 31, and carrying the caps, it is possible to bring down the caps 1 on the inner surface of the aligner 31 and stir and scatter the caps 1 on the inner surface to thereby invert and align the caps 1 also in the aligner 31. A height of each protrusion is preferably about 0.05 to 3 mm and more preferably 0.1 to 0.8 mm. For example, by sticking tape or the like of a proper thickness on the cylindrical inner surface of the aligner 31, it is possible to easily provide the protrusions. It is preferable that no protrusion is provided in an area in the vicinity of the outlet of the aligner 31 and of about a length 2 to 4 times the length of the article for stable transfer to the next step. There is another means for aligning the caps without providing the protrusions, in which friction of the inner surface of the aligner 31 is increased to lift the position of the center of gravity of the cap to a bringing-down position to thereby obtain the similar effects to those of the protrusions. Moreover, by reducing the diameter of the aligner 31, it is possible to cause the position of the center of gravity of the cap to reach the bringing-down position by only lifting the cap to a small height and the similar effects to those of the protrusions can be obtained. With the second article alignment device 30 disposed downstream from the first article alignment device 20, the caps 1 which the two aligners 21, 21 of the first article alignment device 20 have failed to align can be aligned.

(Alignment Operation by the Article Alignment Device 10)

An alignment operation of the caps 1 by the article alignment device 10 will be described below.

Figure 5:
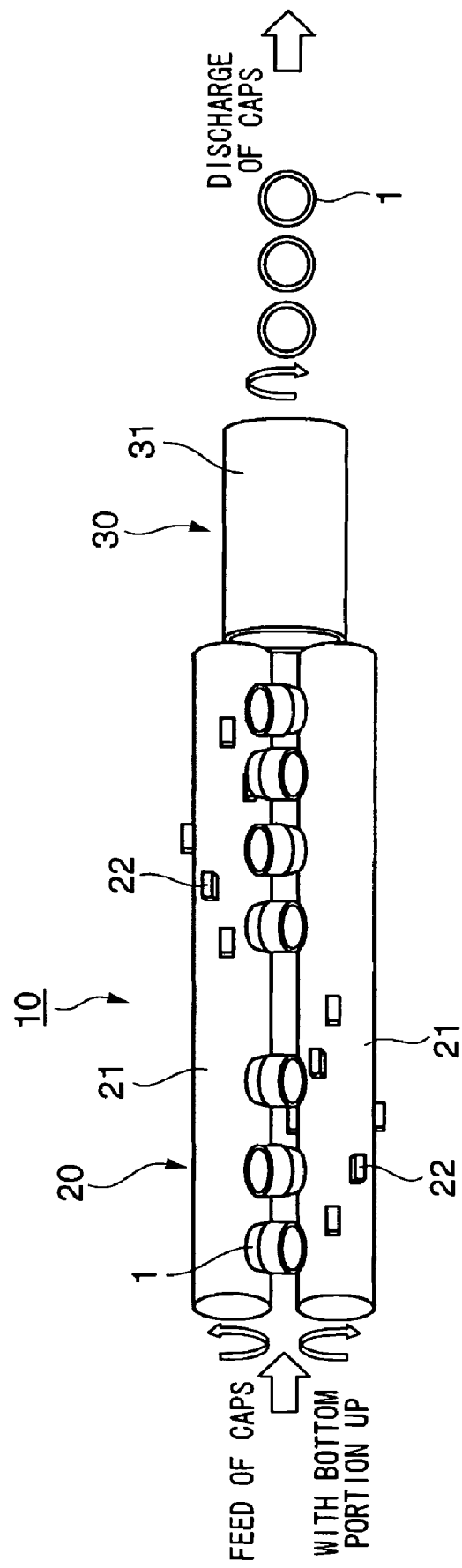
FIG. 5 is a schematic drawing showing an alignment process of the caps fed in attitudes with open faces up.

(A) As shown in FIG. 5, when the open face of the cap 1 fed to the two aligners 21, 21 of the first article alignment device 20 faces up, the top face of the cap 1 faces down. Because an outer peripheral edge of the top face side is in a rounded or cut-off shape, the cap 1 is not inverted by the protrusions 22 of the aligners 21 and does not change in its orientation. The cap enters the second article alignment device 30 while maintained in a target alignment attitude of the feed time and is aligned in the finishing manner in the second article alignment device 30 as described above and is discharged in a target alignment attitude.

Figure 6:
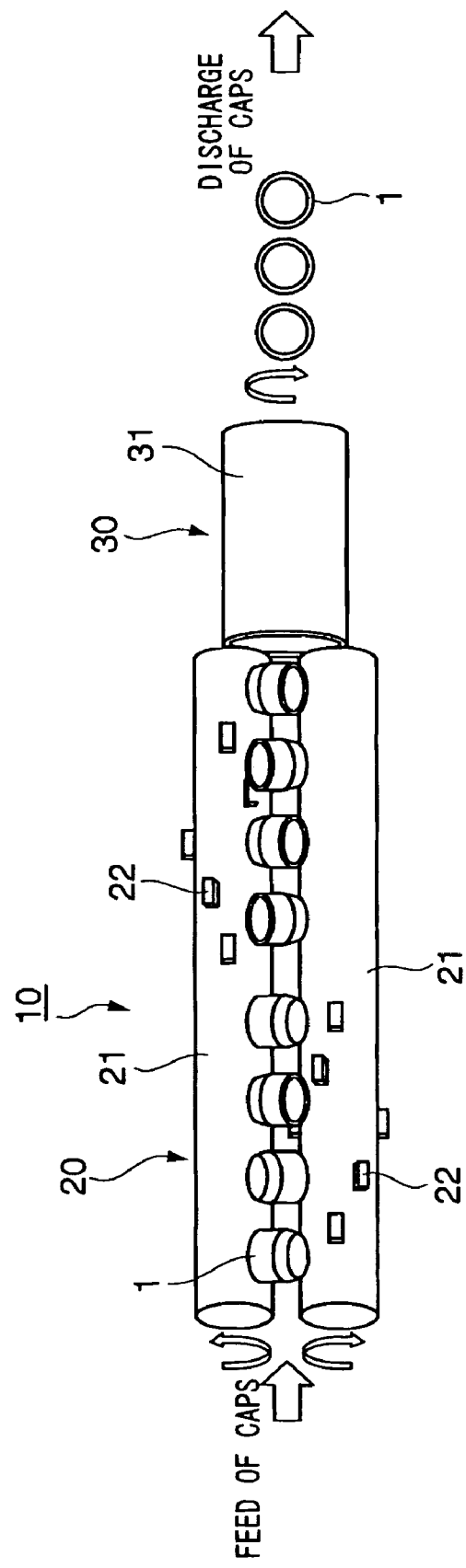
FIG. 6 is a schematic drawing showing an alignment process of the caps fed in attitudes with the open faces down.

(B) As shown in FIG. 6, when the open face of the cap 1 fed to the two aligners 21, 21 of the first article alignment device 20 faces down, the cap 1 is inverted as the edge 1A of the open face of the cap 1 is lifted by the protrusion 22 of the aligner 21 to be aligned into a target alignment attitude with the open face of the cap 1 up. The cap 1 enters the second article alignment device 30 where the cap 1 is aligned in the finishing manner as described above and is discharged in the target alignment attitude.

Figure 7:
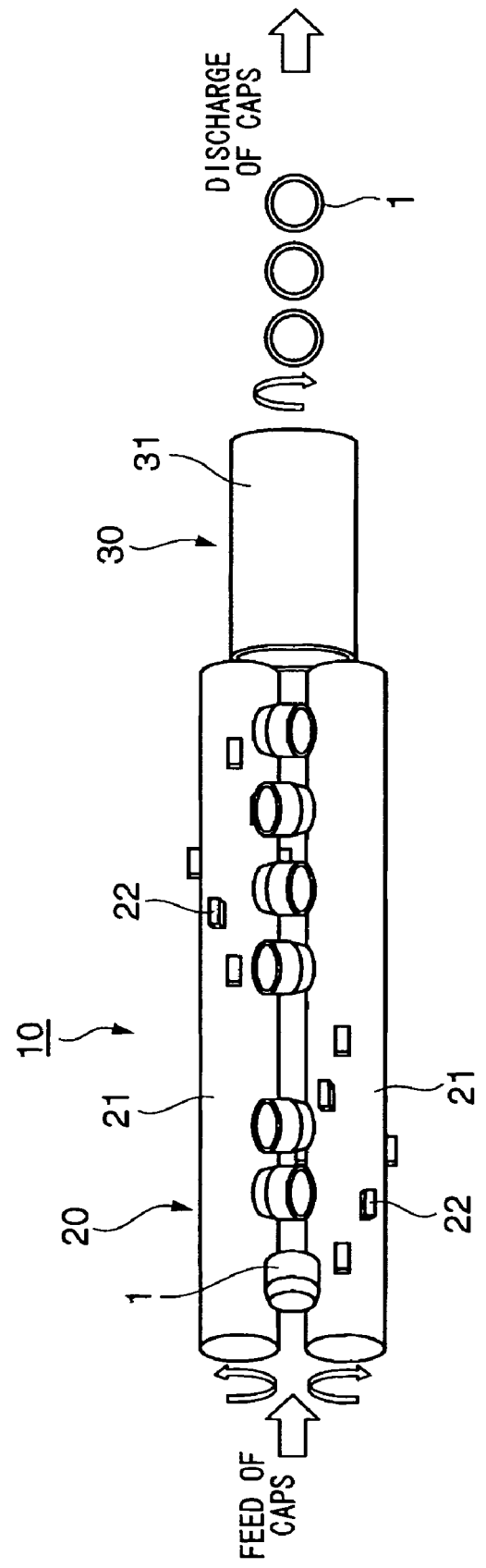
FIG. 7 is a schematic drawing showing an alignment process of the caps fed in attitudes with the open faces facing a downstream side in a direction of travel.

(C) As shown in FIG. 7, when the open face of the cap 1 fed to the two aligners 21, 21 of the first article alignment device 20 faces the downstream side and a side face of the cap 1 is in contact with the aligners 21, the open face side of the side face of the cap 1 is lifted by the protrusions 22 of the aligners 21 and the cap 1 is aligned into a target alignment attitude with a bottom face of the cap 1 up. The cap 1 enters the second article alignment device 30 where the cap 1 is aligned in the finishing manner as described above and is discharged in the target alignment attitude.

Figure 8:
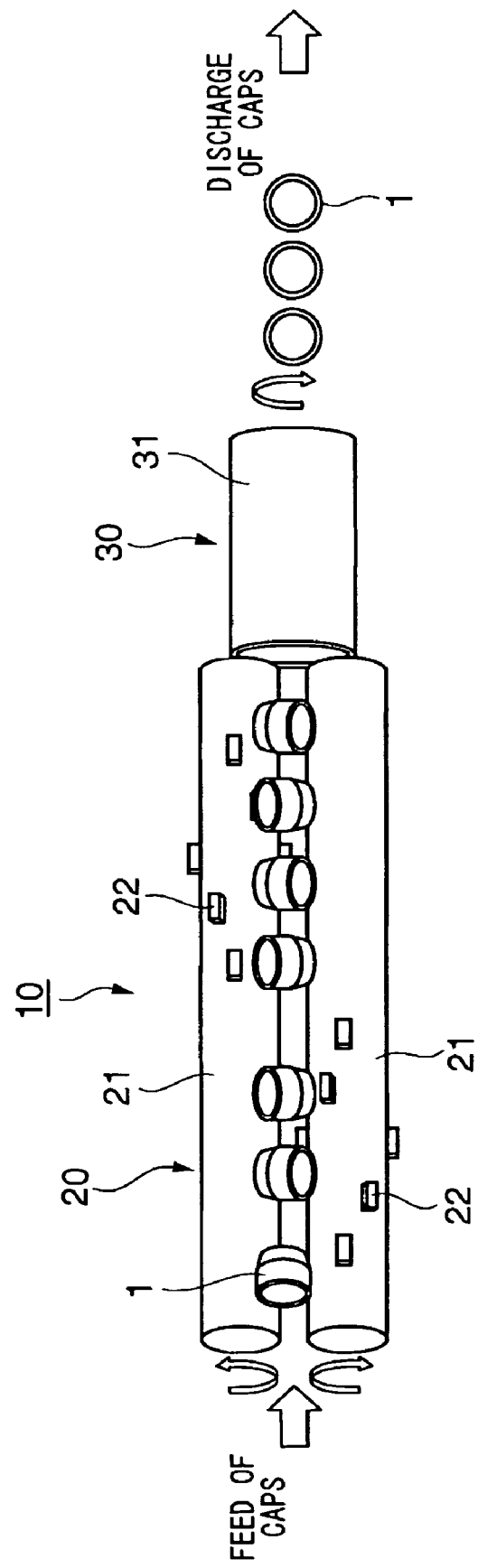
FIG. 8 is a schematic drawing showing an alignment process of the caps fed in attitudes with the open faces facing an upstream side in the direction of travel.

(D) As shown in FIG. 8, when the open face of the cap 1 fed to the two aligners 21, 21 of the first article alignment device 20 faces the upstream side and a side face of the cap 1 is in contact with the aligners 21, the cap 1 is highly unstable. If the two aligners 21, 21 rotate, the cap 1 is inverted and is aligned into a target alignment attitude with the open face of the cap 1 up irrespective of the presence or absence of the protrusions 22. The cap 1 enters the second article alignment device 30 where the cap 1 is aligned in the finishing manner as described above and is discharged in the target alignment attitude.

With the present embodiment, the following operation and effects can be exerted.

(a) While the cap 1 is carried along the cylindrical surfaces of the two rotating aligners 21, 21 disposed substantially parallel in the first article alignment device 20, the edge 1A of the open face of the cap 1 is brought into contact with the protrusion 22 on the surface of the aligner 21 to reliably bring down the cap 1 on the surfaces and to stir and scatter the cap 1 on the surfaces to thereby reliably bring the cap 1 with its open face down into the balanced attitude (the attitude with the open face up and the top face down). With the simple configuration in which aligners 21, 21 in one stage are used, it is possible to stably and reliably align the orientations of the caps 1.

(b) By spirally arranging the protrusions 22 on each aligner 21 and disposing the protrusion 22 on the downstream side in the direction of travel a proper degree ahead in the direction of rotation of the protrusion 22 on the upstream side in the direction of travel, the feed speed of the cap 1 can be suppressed by the downstream protrusion 22, the edge 1A of the open face of the cap 1 can be brought into contact with the upstream protrusion 22 on the surface of the aligner 21 to thereby reliably invert the cap 1, and the cap 1 with its open face down can be reliably brought into the balanced attitude to thereby stably and reliably align orientations of the caps 1.

(c) By making a minimum distance between the protrusion 22 on the aligner 21 and the other adjacent protrusion 22 substantially equal to a minimum width of the cap 1, the feed speed of the cap 1 can be suppressed by the downstream protrusion 22, the edge 1A of the open face of the cap 1 can be brought into contact with the upstream protrusion 22 on the surface of the aligner 21 to thereby reliably invert the cap 1, and the cap 1 with its open face down can be reliably brought into the balanced attitude to thereby stably and reliably align orientations of the caps 1.

(d) With the second article alignment device 30 in which the aligner 31 having the cylindrical inner surface is rotated in one arbitrary direction while kept at the predetermined inclination with respect to the horizontal direction, while the caps 1 coming out of the downstream end of the first article alignment device 20 are put onto the inner surface of the aligner 31 and carried to the discharge port side, it is possible to align the orientations of the caps 1 in the finishing manner.

Figure 9:
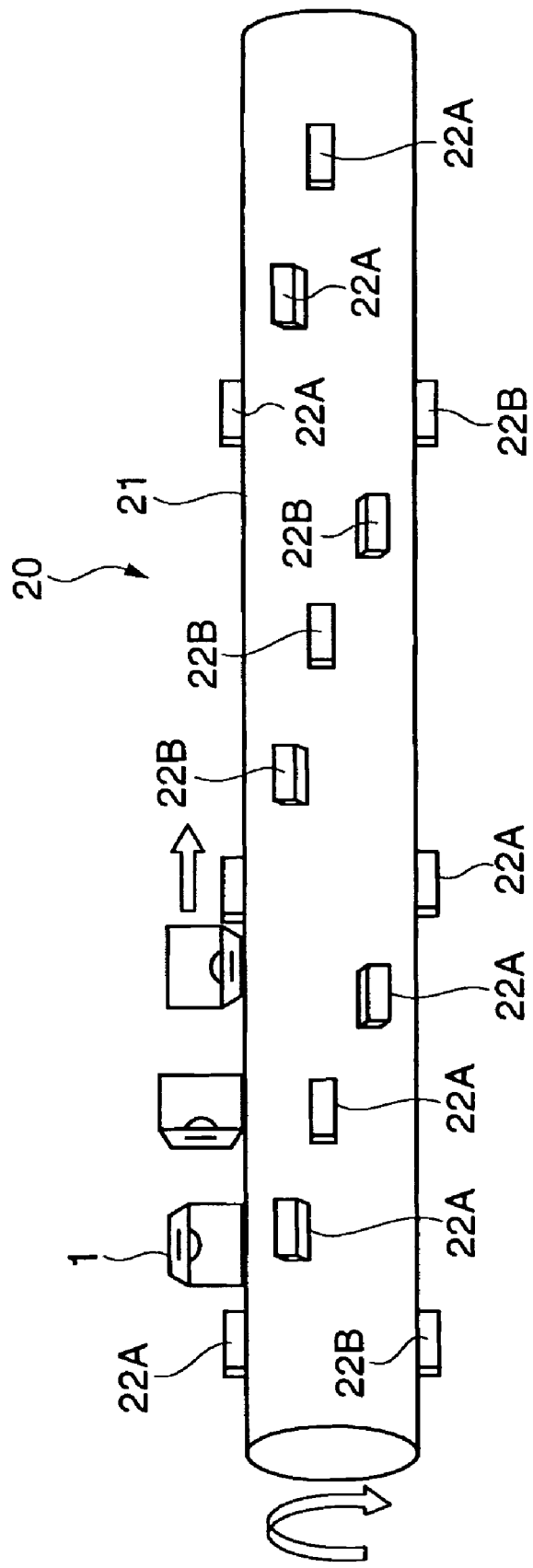
FIG. 9 is a schematic drawing showing a variation of the first article alignment device.

In a variation in FIG. 9, the aligner 21 of the first article alignment device 20 forming the article alignment device 10 is modified. In the aligner 21 of the present variation, the spiral arrangement of the protrusions 22 is a double to four-fold spiral and preferably a double spiral (22A and 22B). By arranging the protrusions 22 on the aligner 21 in a multiple spiral form, it is possible to increase the number of protrusions 22 per unit length of the two aligners 21 and to shorten the aligners 21 to thereby make the article alignment device 10 compact.

Figure 10:
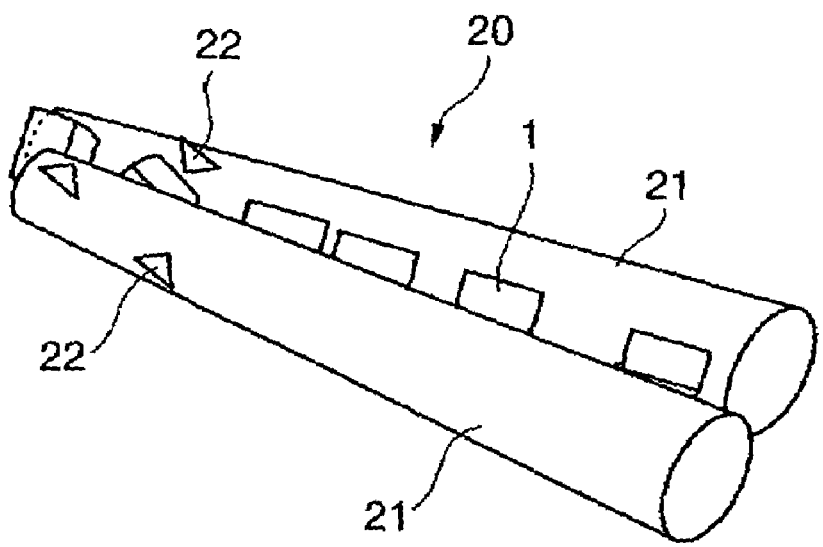
FIG. 10 is a schematic drawing showing a variation of the first article alignment device.

In a variation in FIG. 10, the aligner 21 of the first article alignment device 20 forming the article alignment device 10 is modified. The first article alignment device 20 of the present variation aligns the orientations of the caps 1 by rotating the two aligners 21, 21 having outer surfaces in a truncated cone shape while keeping them at predetermined inclinations with respect to the horizontal direction, putting the caps 1 on their outer surfaces, and carrying the caps from one end side to the other end side. At this time, by increasing diameters of the truncated cone shapes of the outer surfaces of the two aligners 21, 21 toward the downstream side in the direction of travel, the feed speed applied to the caps 1 by the outer surfaces of the aligners 21 is increased on the downstream side in the direction of travel (the peripheral speeds of the outer surfaces are increased) to align the caps 1 while leaving spaces between them in the direction of travel to thereby prevent the caps 1 from interfering with each other. By reducing the diameters of the truncated cone shapes of the outer surfaces of the two aligners 21, 21 toward the downstream side in the direction of travel, the feed speed applied to the caps 1 by the outer surfaces of the aligners 21 is reduced on the downstream side in the direction of travel (the peripheral speeds of the outer surfaces are reduced) to align the caps 1 while leaving no space between them in the direction of travel to thereby prevent carry of the caps 1 while leaving spaces between them.

Figure 11:
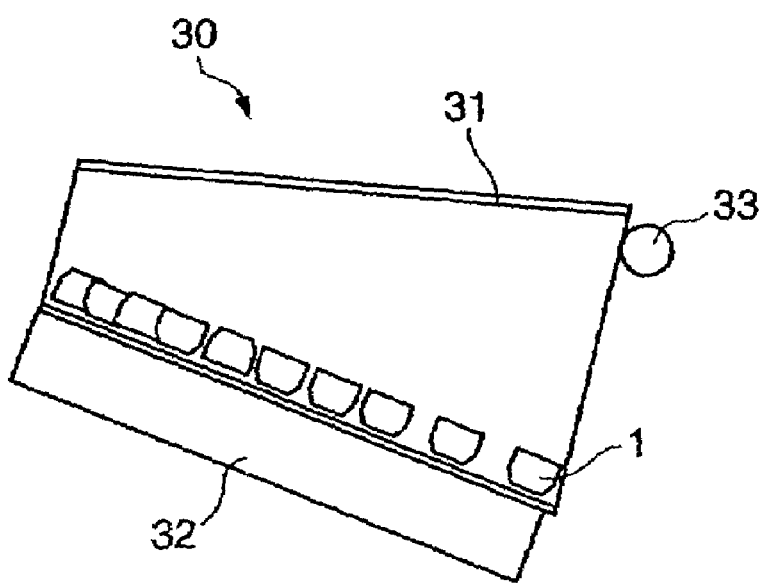
FIG. 11 is a schematic drawing showing a variation of the second article alignment device.

In a variation in FIG. 11, the aligner 31 of the second article alignment device 30 forming the article alignment device 10 is modified. The second article alignment device 30 of the present variation aligns the orientations of the caps 1 by rotating the aligner 31 having an inner surface in a truncated cone shape while keeping the aligner 31 at a predetermined inclination with respect to the horizontal direction, putting the caps 1 into a space formed by the inner surface, and carrying the caps from one side to the other side. At this time, by increasing the diameter of the truncated cone shape of the inner surface of the aligner 31 toward the downstream side in the direction of travel, the feed speed applied to the caps 1 by the inner surface of the aligner 31 is increased on the downstream side in the direction of travel (the peripheral speed of the inner surface is increased) to align the caps 1 while leaving spaces between them in the direction of travel to thereby prevent the caps 1 from interfering with each other. By reducing the diameter of the truncated cone shape of the inner surface of the aligner 31 toward the downstream side in the direction of travel, the feed speed applied to the caps 1 by the inner surface of the aligner 31 is reduced on the downstream side in the direction of travel (the peripheral speed of the inner surface is reduced) to align the caps 1 while leaving no space between them in the direction of travel to thereby prevent carry of the caps 1 while leaving spaces between them.

Results of the embodiments 1 to 10 in which the articles were actually aligned by using the article alignment apparatus 10 are shown in Table 1. The inclination β of the second article alignment device 30 was equal to the inclination α of the first article alignment device 20 in embodiments 3 to 10. The surfaces of the first article alignment device 20 except those in the embodiment 1-1 were subjected to a friction reducing treatment in which adhesive tape made of fluorocarbon resin and manufactured by Chukoh Chemical Industries, Ltd. was stuck on the surfaces. Moreover, the aligned caps 1 were made of polypropylene in every embodiment unless otherwise specified. The protrusions were made of stainless steel in every embodiment unless otherwise specified.

Embodiment 1-1

In a configuration shown in FIGS. 1A and 1B, without providing the second article alignment device 30 and by using only the first article alignment device 20, circular caps 1 were aligned. In a position where the second article alignment device 30 should exist, a conveyer properly regulated to a discharge speed of the caps 1 was disposed (not shown). A target attitude was an attitude with an open face up and most of the caps 1 could be aligned. The surfaces of the aligners 21 of the first article alignment device 20 were given uni-chrome plating that is a very general method of treating a metal surface.

Embodiment 1-2

In the configuration shown in FIGS. 1A and 1B, without providing the second article alignment device 30 and by using only the first article alignment device 20, circular caps 1 were aligned. In a position where the second article alignment device 30 should exist, a conveyer properly regulated to a discharge speed of the caps 1 was disposed (not shown). A target attitude was an attitude with an open face up and most of the caps 1 could be aligned. The surfaces of the aligners 21 of the first article alignment device 20 were subjected to the friction reducing treatment in which the adhesive tape made of fluorocarbon resin and manufactured by Chukoh Chemical Industries, Ltd. was stuck on the surfaces and inclinations were also reduced. As a result, the throughput was slightly enhanced and the alignment efficiency was enhanced considerably as compared with that in the embodiment 1-1.

Embodiment 2

In the configuration shown in FIGS. 1A and 1B, without providing the second article alignment device 30 and by using only the first article alignment device 20, oval caps 1 were aligned. In a position where the second article alignment device 30 should exist, a conveyer properly regulated to a discharge speed of the caps 1 was disposed (not shown). A target attitude was an attitude with an open face up and most of the caps 1 could be aligned.

Embodiment 3-1

In the configuration shown in FIGS. 1A and 1B, circular caps 1 were aligned. A target attitude was an attitude with an open face up and most of the caps 1 could be aligned. By providing the second article alignment device 30, the center line of each cap 1 could be aligned with the plumb line from an inclined state and the alignment success rate was higher than that in the embodiment 1-2.

Embodiment 3-2

In the configuration shown in FIGS. 1A and 1B, circular caps 1 were aligned. The caps 1 made of aluminum were used. Packing made of resin was fitted in an inner side of the top face. A target attitude was an attitude with an open face up and most of the caps 1 could be aligned. By providing the second article alignment device 30, the center line of each cap 1 could be aligned with the plumb line from an inclined state and the alignment success rate was high. Both influences of the change in material and reduction in weight of the cap 1 as compared with the resin cap 1 did not become problems.

Embodiment 4-1

In the configuration shown in FIGS. 1A and 1B, oval caps 1 were aligned. A target attitude was an attitude with an open face up and most of the caps 1 could be aligned. By providing the second article alignment device 30, the center line of each cap 1 could be aligned with the plumb line from an inclined state and the alignment success rate was higher than that in the embodiment 2.

Embodiment 4-2

In the configuration shown in FIGS. 1A and 1B, oval caps 1 were aligned. Here, the protrusions were made of urethane rubber. A target attitude was an attitude with an open face up and most of the caps 1 could be aligned. By providing the second article alignment device 30, the center line of each cap 1 could be aligned with the plumb line from an inclined state. Moreover, because the protrusions were made of flexible material, the alignment success rate was higher than that in the embodiment 4-1.

Embodiment 4-3

In the configuration shown in FIGS. 1A and 1B, oval caps 1 were aligned. Here, each protrusion was made of slightly adhesive material that was a suction member. As the slightly adhesive material, "Hitohada (human skin) gel sheet" (trade name) manufactured by EXSEAL CORPORATION was stuck on a surface of each protrusion. A target attitude was an attitude with an open face up and most of the caps 1 could be aligned. By providing the second article alignment device 30, the center line of each cap 1 could be aligned with the plumb line from an inclined state. Moreover, because the protrusions were made of slightly adhesive material, the alignment success rate was slightly higher than that in the embodiment 4-1.

Embodiment 4-4

In the configuration shown in FIGS. 1A and 1B, oval caps 1 were aligned. Here, as shown in FIG. 12, each protrusion 22 included a suction mechanism 41 by the action of air suction as a suction member. Suction was carried out in an angle range of 270° to 0° as shown in FIG. 12 to thereby exert an influence of suction on the cap 1 only in a necessary angle range. A target attitude was an attitude with an open face up and most of the caps 1 could be aligned. By providing the second article alignment device 30, the center line of each cap 1 could be aligned with the plumb line from an inclined state. Moreover, because the protrusion included the suction mechanism as the suction member, the alignment success rate was higher than that in the embodiment 4-1.

Embodiment 5

In the configuration shown in FIGS. 1A and 1B, rectangular and large caps 1 were aligned. As the caps were upsized, the protrusion heights, the clearance between and the rotational speeds, and the like of the two aligners 21, 21 were regulated. A target attitude was an attitude with an open face up and most of the caps 1 could be aligned.

Embodiment 6

In the configuration shown in FIGS. 1A and 1B, circular caps 1 with their top faces not rounded were aligned. A target attitude was an attitude with an open face up and most of the caps 1 could be aligned. Although the alignment success rate was slightly lower than that in the embodiment 3-1, it was in a satisfactory range for use.

Embodiment 7

In the configuration shown in FIGS. 1A and 1B, circular caps 1 were aligned. A target attitude was an attitude with an open face up and most of the caps 1 could be aligned. In the present embodiment, the spiral arrangement of the protrusions 22 of the first article alignment device 20 was a double spiral and lengths of the aligners 20 were reduced. In spite of the compact first article alignment device 20, the alignment success rate was equal to that in the embodiment 3-1 by an effect of the multiple spiral.

Embodiment 8

In the configuration shown in FIGS. 1A and 1B, oval caps 1 were aligned. A target attitude was an attitude with an open face up and most of the caps 1 could be aligned. In the present embodiment, protrusions of heights of 0.2 mm were provided on the inner surface of the aligner 31 of the second article alignment device 30. Because the second article alignment device 30 aligned the caps 1 which the first article alignment device 20 had failed to align, the alignment success rate was higher than that in the embodiment 4-1.

Embodiment 9

Based on the configuration shown in FIGS. 1A and 1B, the aligners 21 of the first article alignment device 20 were formed into aligners having the outer surfaces in the truncated cone shapes as shown in FIG. 10 to align circular caps 1. A target attitude was an attitude with an open face up and most of the caps 1 could be aligned. By increasing the diameters of the truncated cone shapes toward the downstream side in the direction of travel, the caps 1 were prevented from interfering with each other and the alignment success rate was slightly increased as compared with that in the embodiment 3. Moreover, at the outlet, the spaces between the caps were slightly greater than those in the embodiment 3-1 and an effect of alignment while leaving spaces between the caps could be recognized.

Embodiment 10

Based on the configuration shown in FIGS. 1A and 1B, the aligner 31 of the second article alignment device 30 was formed into an aligner having the inner surface in the truncated cone shape as shown in FIG. 11 to align oval caps. A target attitude was an attitude with an open face up and most of the caps 1 could be aligned. By increasing the diameter of the truncated cone shape toward the downstream side in the direction of travel, the caps 1 were prevented from interfering with each other and the alignment success rate was slightly increased as compared with that in the embodiment 4. Moreover, at the outlet, the spaces between the caps were slightly greater than those in the embodiment 4-1 and an effect of alignment while leaving spaces between the caps could be recognized.

With the present invention, by using a simple configuration, it is possible to stably and reliably align orientations of articles.

TABLE 1

| | Embodiment | | 1-1 | 1-2 | 2 | 3-1 | 3-2 | 4-1 | 4-2 | 4-3 |
|---|---|---|---|---|---|---|---|---|---|---|
| Object to be aligned | Top shape | | Circle | Circle | Oval | Circle | Circle | Oval | Oval | Oval |
| | Diameter | (mm) | 32 | 32 | — | 32 | 28 | — | — | — |
| | Length | (mm) | — | — | 34 | — | — | 34 | 34 | 34 |
| | Width | (mm) | — | — | 59 | — | — | 59 | 59 | 59 |
| | Height | (mm) | 20 | 20 | 28 | 20 | 18 | 28 | 28 | 28 |
| | Weight | (g) | 6 | 6 | 8 | 6 | 2 | 8 | 8 | 8 |
| First article alignment device | Aligner inclination | (degree) | 9 | 5 | 7 | 5 | 5 | 7 | 7 | 7 |
| | Aligner diameter | (mm) | 62 | 62 | 62 | 62 | 62 | 62 | 62 | 62 |
| | Aligner length | (mm) | 1000 | 1000 | 1000 | 1000 | 1000 | 1000 | 1000 | 1000 |
| | Clearance between aligners | (mm) | 14 | 14 | 16 | 14 | 14 | 16 | 16 | 16 |
| | Spiral arrangement of protrusions | (number of spirals) | 1 | 1 | 1 | 1 | 1 | 1 | 1 | 1 |
| | Upstream side of protrusions *1) | (mm) | 100~500 | 100~500 | 100~500 | 100~500 | 100~500 | 100~500 | 100~500 | 100~500 |
| | Downstream side of | (mm) | 500~ | 500~ | 500~ | 500~900 | 500~900 | 500~900 | 500~900 | 500~900 |

TABLE 1-continued

| | | | | | | | | | | |
|---|---|---|---|---|---|---|---|---|---|---|
| | protrusions *1) | | 900 | 900 | 900 | | | | | |
| | Protrusion height | (mm) | 5 | 5 | 5 | 5 | 5 | 5 | 5 | 5 |
| | Protrusion longitudinal length | (mm) | 20 | 20 | 20 | 20 | 20 | 20 | 20 | 20 |
| | Protrusion arrangement angle | (degree) | 45 | 45 | 45 | 45 | 45 | 45 | 45 | 45 |
| | Minimum Distance between protrusions | (mm) | 29 | 29 | 29 | 29 | 29 | 29 | 29 | 29 |
| | Aligner Rotational speed | (R.P.M) | 72 | 72 | 80 | 72 | 72 | 80 | 80 | 80 |
| | Peripheral speed *3) | (m/sec) | 0.23 | 0.23 | 0.26 | 0.23 | 0.23 | 0.26 | 0.26 | 0.26 |
| Second article alignment device | Aligner Diameter | (mm) | — | — | — | 107 | 107 | 107 | 107 | 107 |
| | Aligner length | (mm) | — | — | — | 300 | 300 | 300 | 300 | 300 |
| | Protrusion height | (mm) | — | — | — | — | — | — | — | — |
| | Aligner Rotational speed | (R.P.M) | — | — | — | 51 | 51 | 51 | 51 | 51 |
| | Peripheral speed *4) | (m/sec) | — | — | — | 0.29 | 0.29 | 0.29 | 0.29 | 0.29 |
| Throughput | | (number/min) | 82 | 90 | 70 | 90 | 98 | 70 | 70 | 70 |
| Alignment success rate | | (%) | 81 | 89 | 90 | 91 | 93 | 92 | 95 | 94 |

| | | Embodiment | 4-4 | 5 | 6 | 7 | 8 | 9 | 10 |
|---|---|---|---|---|---|---|---|---|---|
| Object to be aligned | Top shape | | Oval | Rectangle | Circle *2) | Circle | Oval | Circle | Oval |
| | Diameter | (mm) | — | — | 32 | 32 | — | 32 | — |
| | Length | (mm) | 34 | 55 | — | — | 34 | — | 34 |
| | Width | (mm) | 59 | 57 | — | — | 59 | — | 59 |
| | Height | (mm) | 28 | 40 | 20 | 20 | 28 | 20 | 28 |
| | Weight | (g) | 8 | 25 | 7 | 6 | 8 | 6 | 8 |
| First article alignment device | Aligner inclination | (degree) | 7 | 6 | 5 | 5 | 7 | 5 | 7 |
| | Aligner diameter | (mm) | 62 | 62 | 62 | 62 | 62 | inlet43 outlet90 | 62 |
| | Aligner length | (mm) | 1000 | 1000 | 1000 | 800 | 1000 | 1000 | 1000 |
| | Clearance between aligners | (mm) | 16 | 38 | 14 | 14 | 16 | 14 | 16 |
| | Spiral arrangement of protrusions | (number of spirals) | 1 | 1 | 1 | 2 | 1 | 1 | 1 |
| | Upstream side of protrusions *1) | (mm) | 100~500 | 100~500 | 100~500 | 100~400 | 100~500 | 100~500 | 100~500 |
| | Downstream side of protrusions *1) | (mm) | 500~900 | 500~900 | 500~900 | 400~700 | 500~900 | 500~900 | 500~900 |
| | Protrusion height | (mm) | 5 | 10 | 5 | 5 | 5 | 5 | 5 |
| | Protrusion longitudinal length | (mm) | 20 | 20 | 20 | 20 | 20 | 20 | 20 |
| | Protrusion arrangement angle | (degree) | 45 | 45 | 45 | 45 | 45 | 45 | 45 |
| | Minimum Distance between protrusions | (mm) | 29 | 29 | 29 | 29 | 29 | 30 | 29 |
| | Aligner Rotational speed | (R.P.M) | 80 | 127 | 72 | 72 | 80 | 72 | 80 |
| | Peripheral speed *3) | (m/sec) | 0.26 | 0.41 | 0.23 | 0.23 | 0.26 | 0.25 | 0.26 |
| Second article alignment device | Aligner Diameter | (mm) | 107 | 107 | 107 | 107 | 107 | 107 | inlet80 outlet120 |
| | Aligner length | (mm) | 300 | 300 | 300 | 300 | 300 | 300 | 400 |
| | Protrusion height | (mm) | — | — | — | — | 0.2 | — | — |
| | Aligner Rotational speed | (R.P.M) | 51 | 51 | 51 | 51 | 51 | 51 | 51 |
| | Peripheral speed *4) | (m/sec) | 0.29 | 0.29 | 0.29 | 0.29 | 0.29 | 0.29 | 0.27 |
| Throughput | | (number/min) | 70 | 90 | 90 | 90 | 70 | 90 | 70 |
| Alignment success rate | | (%) | 95 | 98 | 90 | 94 | 95 | 93 | 92 |

*1) An arrangement area from a feed side is indicated.
*2) A top face is not rounded.
*3) Regarding the first article alignment device in the embodiment 9, a peripheral speed at a longitudinal central portion (of a diameter that is an average of diameters at an inlet and an outlet) of the aligner is indicated.
*4) Regarding the second article alignment device in the embodiment 10, a peripheral speed at a longitudinal central portion (of a diameter that is an average of diameters at an inlet and an outlet) of the aligner is indicated.

The invention claimed is:

1. An article alignment apparatus including an article alignment device comprising two aligners having cylindrical outer surfaces parallel to each other, wherein each aligner slants at a predetermined inclination with respect to a horizontal direction and the cylindrical outer surface of each aligner is provided with a number of protrusions, so that the aligners are capable of aligning articles on the cylindrical outer surfaces of the aligners, so that the articles are movable from one end to the other end of the aligners;

wherein the protrusions are suction members.

2. An article alignment apparatus according to claim 1, wherein the protrusions on each aligner are disposed spirally on the cylindrical outer surface and the protrusions on the downstream side in the direction of travel is disposed at a position ahead in a direction of rotation of the protrusions on an upstream side in the direction of travel.

3. An article alignment apparatus according to claim 1 or 2, wherein a minimum distance between each protrusion and the other adjacent protrusion on each aligner is substantially equal to a minimum width of one of the articles to be aligned by the apparatus.

4. An article alignment apparatus according to claim 1 or 2, wherein the cylindrical outer surfaces of the aligners are subjected to a friction reducing treatment.

5. An article alignment apparatus according to claim 1 or 2, wherein the protrusions are made of a flexible material.

6. An article alignment apparatus according to claim 1, wherein the articles which aligned by the article alignment apparatus are caps.

7. An article alignment apparatus, comprising:
a first article alignment device including an article alignment device comprising two aligners having cylindrical outer surfaces parallel to each other, wherein each aligner slants at a predetermined inclination with respect to a horizontal direction and the cylindrical outer surface of each aligner is provided with a number of protrusions, so that the aligners are capable of aligning articles on the cylindrical outer surfaces of the aligners, so that the articles are movable from one end to the other end of the aligners, and further comprising a second article alignment device having a cylindrical inner surface disposed downstream from the first article alignment device, wherein the second article alignment device is rotated in one arbitrary direction while kept at a predetermined inclination with respect to the horizontal direction to align the orientations of the articles in a finishing manner in a process of putting the articles coming out of a downstream end of the first article alignment device on the inner surface of the second article alignment device and carrying the articles to a discharge port side.

8. An article alignment apparatus according to claim 7, wherein the articles which are aligned by the article alignment apparatus are caps.

9. An article alignment apparatus according to claim 7, wherein the protrusions on each aligner are disposed spirally on the cylindrical outer surface and the protrusions on the downstream side in the direction of travel is disposed at a position ahead in a direction of rotation of the protrusions on an upstream side in the direction of travel.

10. An article alignment apparatus according to claim 7 or 9, wherein a minimum distance between each protrusion and the other adjacent protrusion on each aligner is substantially equal to a minimum width of one of the articles to be aligned by the apparatus.

11. An article alignment apparatus according to claim 7 or 9, wherein the cylindrical outer surfaces of the aligners are subjected to a friction reducing treatment.

12. An article alignment apparatus according to claim 7 or 9, wherein the protrusions are made of a flexible material.

13. An article alignment apparatus according to claim 7 or 9, wherein the protrusions are suction members.

* * * * *